United States Patent [19]

Hendrick

[11] Patent Number: 4,464,931
[45] Date of Patent: Aug. 14, 1984

[54] METHOD AND APPARATUS FOR CHECKING THE OPERATING CONDITIONS OF A FLOW AND PRESSURE CONTROL MEMBER

[75] Inventor: Jean Hendrick, Friville-Escarbotin, France

[73] Assignee: 501 Robinette S.F.R., S.A., Fressenneville, France

[21] Appl. No.: 366,426

[22] Filed: Apr. 7, 1982

[30] Foreign Application Priority Data

Apr. 15, 1981 [FR] France ............................. 81 07953

[51] Int. Cl.$^3$ ......................................... G01M 19/00
[52] U.S. Cl. ..................................................... 73/168
[58] Field of Search ......................................... 73/168

[56] References Cited

U.S. PATENT DOCUMENTS

| | | | |
|---|---|---|---|
| 2,364,709 | 12/1944 | Greer | 73/168 |
| 3,098,382 | 7/1963 | Hoffman et al. | 73/168 |
| 4,181,017 | 1/1980 | Markle | 73/168 |

FOREIGN PATENT DOCUMENTS

| | | |
|---|---|---|
| 2801183 | 7/1979 | Fed. Rep. of Germany . |
| 2220784 | 10/1974 | France . |
| 2343179 | 9/1977 | France . |

OTHER PUBLICATIONS

T. T. Evans, *Hydraulics and Pneumatics*, vol. 30, No. 7, Jul. 1977, pp. 91–93.

*Primary Examiner*—S. Clement Swisher
*Attorney, Agent, or Firm*—Kerkam, Stowell, Kondracki & Clarke

[57] ABSTRACT

An apparatus and method for checking the operation of a fluid flow and/or pressure control member with a given and constant flow, wherein the control member is disposed at the outlet of a main fluid circuit connected to a source of pressurized fluid and a bypass circuit at its inlet and having a fluid bleed circuit with an isolation device at its outlet upstream from the control member. The main circuit includes a flow meter, a pressure meter, a progressive volume variation member to enable the pressure in the main circuit to be varied gradually and without fluctuations, and isolation devices for isolating the volume variation member from the control member and for isolating the inlet of the main circuit from the fluid source and the bypass circuit. Electrical comparators, triggered at different times in response to the actuation of different ones of the components of the apparatus are employed for comparing the pressure in the main circuit with reference pressures for checking the operation of the control device.

16 Claims, 1 Drawing Figure

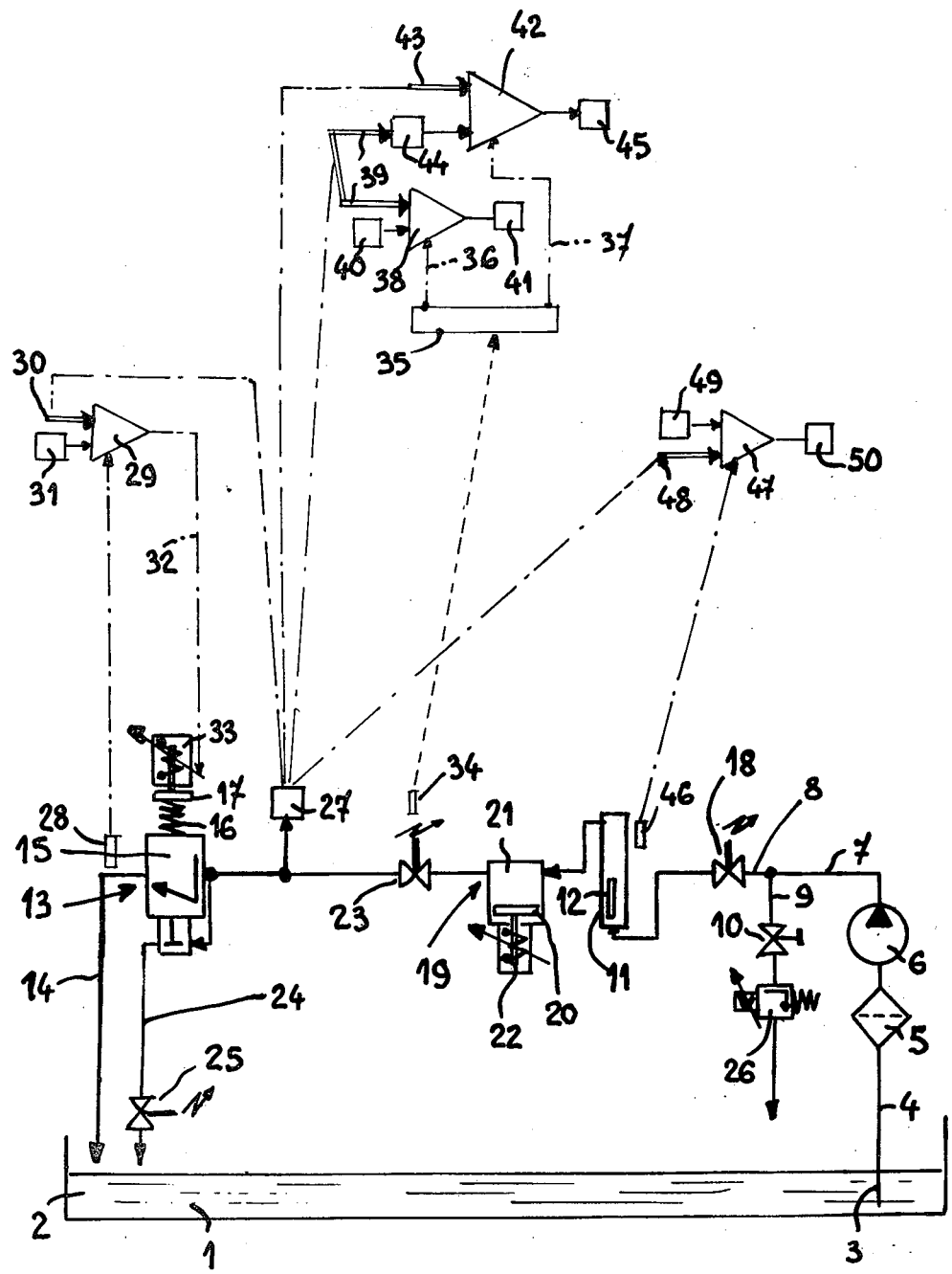

METHOD AND APPARATUS FOR CHECKING THE OPERATING CONDITIONS OF A FLOW AND PRESSURE CONTROL MEMBER

BACKGROUND OF THE INVENTION

The invention relates to an apparatus and method for checking the operating condition of a fluid flow and pressure control member such as an injector, a valve, a flap, a safety unit etc., hereinafter called a such "control member".

It is known that control members must ensure the flow of the fluid as soon as the latter has reached a certain so-called calibration pressure, but also they must completely interrupt the flow when the pressure of the fluid is lower than the appointed calibration pressure and ensure at least a predetermined flow of this fluid as soon as its pressure exceeds the calibration pressure.

It is hitherto known to use for checking the operation of such control members an installation comprising a pump which removes fluid from a tank and delivers it to a circuit which passes through a flowmeter and to the control member before returning to the tank.

Between the flowmeter and the control member is connected on the one hand a pressure reader in the said circuit and on the other hand a direct return pipe to the tank under the control of a manual valve.

In this installation the method of checking is very old-fashioned. For instance, to check the calibration pressure the manual valve must gradually be closed in order to reduce the delivery through a by-pass pipe which increases the pressure in the main pipe until there is some flow from the control member.

The pressure in the circuit is then checked and if it does not correspond to the desired pressure the control member is regulated; then this process is repeated and the pressure rechecked until the correct pressure is reached by successive trials.

In order to check the fluid-tightness of the control member, which fluid tightness must be total as soon as the fluid therein is at a reference pressure which is lower than the calibration pressure, the manual valve is operated until the said reference pressure is obtained in the circuit and the control member is inspected immediately to ensure that there is no longer a flow.

In order to check that a certain desired flow is obtained as soon as the pressure of the fluid arriving at the control member is at another reference pressure which is greater than the calibration pressure, the manual valve is again operated until the aforesaid greater reference pressure is obtained in the circuit and a reading is immediately taken from the flowmeter, taking into account the possible effect on the flowmeter, according to its connection point, of the flow through the by-pass of the control member. It is evident that this by-pass cannot be interrupted because this would further increase pressure in the circuit.

SUMMARY OF THE INVENTION

Briefly the invention seeks to provide an apparatus and a method which permit rapid and safe checking operations. To this end, the invention provides, in a installation for checking the operating conditions of a flow and pressure control member of the type mentioned above, apparatus characterized in that it comprises:

on the one hand, located at the input of the main circuit, an isolating member for at least certain checking operations to be performed, the isolating member enabling the entire main circuit to be isolated both from the pipe connected to the pressurized liquid source and from the by-pass circuit; and on the other hand, a progressive and constant volume member of the volume of the main circuit, acting on the entire main circuit from the control member to the above mentioned isolating member.

The invention also provides a method of checking by use of this apparatus.

BRIEF DESCRIPTION OF THE DRAWING

The invention will be well understood with the aid of the description which follows and by reference to the accompanying single figure which schematically represents an installation according to the invention.

DESCRIPTION OF THE PREFERRED EMBODIMENT

Referring now to the drawing it can be seen that the installation may comprise a tank 1 containing the liquid 2 used for the checking operations and in which is immersed the base 3 of a pipe 4 which is connected to the suction aperture of a pump 6 after passing through a filter 5.

Instead of the above, the installation can obviously be connected to another source such as a distribution network for pressurized liquid.

The outlet pipe 7 of this source (pump 6) flows simultaneously into a main circuit 8 and into a by-pass circuit 9 through which the liquid returns to the tank 1 under the control of at least one valve 10 which allows the load loss and the flow in the main circuit to be varied.

The main circuit 8 passes through a flowmeter 11, which may employ a Cartesian diver gauge 12, and then arrives at a control member 13 that is to be checked.

The liquid which may be delivered by this control member 13 returns to the tank 1 for instance through a return pipe 14. The control member 13 comprises, for instance a safety valve 15 which opens under the control of the pressure of the liquid upstream of the said control member, which pressure counteracts the effect of a return spring 16, the force of which may be regulated by a calibration device 17 such as a piston or a pressure screw.

According to essential features of the invention the apparatus comprises:

on the one hand, located at the input of the main circuit 8, an isolating member 18 which, for at least some checking operations, allows this main circuit to be isolated both from the delivery pipe 7 of the pump and from the by-pass circuit 9 returning to the tank and;

on the other hand, acting in the main circuit between the control member 13 and the isolating member 18, a progressive and constant volume variation member 19 for varying the volume of this main circuit.

The progressive volume variation member 19 may comprise any means acting progressively and especially without fluctuations and, for instance, may include a piston 20 entering to a greater or lesser extent into a housing 21 under the control of an electrically driven screw jack 22 or a precisely regulated hydraulic jack, or a pump of a type which will ensure a flow without fluctuations.

By means of this isolating valve 18 and the volume variation member 19 of the main circuit 8, when checking is carried out the pressure in the main circuit can be varied very gradually and without fluctuations and, therefore, without using the pump 6 which would cause the said fluctuations, and without acting upon the valve 10 of the by-pass pipe 9.

According to another feature of the invention, an intermediate isolating member 23 is inserted between the volume variation member 19 and the control member 13.

In a likewise notable manner a bleed circuit 24 is connected to the main circuit 8 and is controlled by a third isolating member 25.

The various isolating members 18, 23, 25 mentioned above preferably comprise electric valves operating completely or not at all.

On the other hand a flow regulating member 26 such as a throttle or an electric valve whose opening can be regulated is inserted on the by-pass pipe 9.

A pressure reader 27 is connected in the section of the main circuit between the control member 13 and the intermediate isolating member 23 and, as indicated hereinafter, provides a signal representative of the pressure in the main circuit.

The checking method put into operation with the aid of this apparatus is divided into three stages namely: a first stage of checking and regulating the so-called calibration pressure, a second stage of controlling the fluid tightness at a pressure lower than the calibration pressure, and a third stage of checking the flow at a pressure greater than the calibration pressure.

The first stage occurs as follows:

The isolating members 18, 23, 25 are opened and the pump is actuated in order to fill the main circuit by the pressure of the pump, less the load losses, in such a way that the filling pressure is greater than the calibration pressure.

The isolating member 25 of the bleed circuit 24 and the isolating member 18 located at the input of the main circuit 8 are then closed.

By acting upon the volume variation member 19 the pressure in the main circuit 8 is then gradually made to rise without fluctuations until the flow is started by the control member 13.

A circuit 28, for instance, which responds to the start of the action of the volume variation member 19, triggers a comparator 29 for comparing a signal 30 from pressure reader 27 representing the actual pressure in the circuit and a signal 31 representing the reference calibration pressure.

According to its own direction the differential signal 32, resulting from the comparison, drives in one direction or the other a motor 33 connected to the calibration device 17 until the reference calibration pressure is obtained. The motor controls the calibration device, for instance, by translation or by screwing or unscrewing.

The advantage of this method of calibration is evidently permanent regulation and especially when the pressure in the circuit is isolated from the effects of the pump fluctuations.

Starting from the situation obtained according to the first stage the second stage occurs as follows:

The intermediate isolating member 23 is closed. As the pressure in the section of the circuit to which the member to be checked is connected is at the calibration pressure, the said control member 13 allows a slight flow which results in a fall in pressure the value of which is proportional to the time which passes from the closure of the intermediate isolating member.

A circuit 34 which responds to the closure of the intermediate isolating member 23, triggers at least one time measuring means 35, such as a set of timing devices, which emits two signals 36, 37; it emits a signal 36 after a time has elapsed which is normally more than sufficient for the closure of the member to be checked, and emits a signal 37 after a slightly longer time. For instance, the signals may follow each other respectively two and four seconds after the closure of the intermediate valve 23.

The first signal 36 triggers a comparator 38 for comparing a signal 39 from pressure reader 27 representing the actual pressure in the section of the circuit and a signal 40 representing a reference pressure for the moment in question which, for instance, may be equal to the calibration pressure less one bar.

If the actual pressure is lower than this reference pressure, this means that the control member has closed too late. The comparator 38 which detects this discrepancy then triggers a fault circuit 41.

The second signal 37 triggers a comparator 42 for comparing a signal 43 representing the actual pressure in the circuit and the signal 39 representing the pressure present in the circuit when the first signal was emitted, which signal 39 had been retained in the memory 44 for this purpose. If there is a discrepancy between the two pressures, which would definitely indicate that the control member was not yet closed when the first signal 36 was emitted, the comparator 42 triggers a fault circuit 45. The double checking of the fluid tightness and the method followed are therefore much more reliable than mere visual checking of the absence of flow after having brought the circuit to the reference pressure.

The third stage of checking is as follows:

The isolating member 25 of the bleed circuit 24 remains closed but both the isolating member 18 of the input of the main circuit and the intermediate isolating member 23 of this circuit are opened.

The flow regulating member 26 of the by-pass pipe 9 is opened completely and the pump 6 is actuated.

The flow regulating member 26 in the by-pass pipe is then gradually closed in order to reduce the load losses and at the same time to cause the pressure in the main circuit 8 to rise gradually.

Closing the flow regulating member 26 of the by-pass pipe also causes an increase in the flow in the main circuit.

When the flowmeter 11 indicates a predetermined flow in the main circuit corresponding, for instance, to a certain height of the Cartesian diver gauge 12, a circuit 46 triggers a comparator 47 for comparing a signal 48 from pressure reader 27 representing the actual pressure in the main circuit and a signal 49 representing a reference pressure, for instance equal to the calibration pressure plus one bar.

Therefore, when the pressure in the main circuit is greater than the reference pressure the comparator 47 triggers a fault circuit 50, which is the reverse step to that which was previously followed since in that case the pressure was caused to rise to the so-called reference pressure and only the flow was checked.

Obviously the installation also comprises a means (not shown) which synchronizes the various stages of checking operations.

I claim:

1. Apparatus for checking the operation of a fluid control member that is actuated at a predetermined pressure, the apparatus comprising a main fluid circuit having an inlet and an outlet and including therein flow measuring means for measuring the fluid flow therethrough and pressure measuring means for measuring the pressure therein, the control member being disposed at said outlet; pressurized fluid source means for providing pressurized fluid to said inlet; a fluid bypass circuit connected to said inlet for bypassing fluid supplied to the inlet, the bypass circuit including flow regulating means for regulating the fluid flow through the bypass circuit; a first controllable isolation device disposed in the main circuit adjacent to said inlet for isolating the main circuit from the fluid source means and from the bypass circuit; a bleed circuit connected at the outlet of the main circuit upstream from said control member for bleeding fluid from the main circuit, the bleed circuit including a second controllable isolation device for isolating the bleed circuit from the main circuit; volume variation means disposed within the main circuit downstream of the first isolation device for varying, without fluctuations, the pressure in the main circuit; and a third controllable isolation device disposed between the volume variation means and the control member for isolating the volume variation means from the control member.

2. An apparatus according to claim 1, wherein the volume variation means comprises a piston disposed within a housing, and an electrically controlled screw jack for controlling the penetration of the piston into the housing.

3. An apparatus according to claim 1, wherein the volume variation means comprises a piston disposed within a housing, and a hydraulic jack for controlling the penetration of the piston into the housing.

4. An apparatus according to claim 1, wherein the volume variation means comprises a piston disposed within a housing, and a pump capable of providing a fluid outlet that is free from pulsations for controlling the penetration of the piston into the housing.

5. An apparatus according to claim 1, wherein said first, second and third isolation devices comprise electrical valves.

6. An apparatus according to claim 1, wherein the control member includes adjustable calibrating means for setting the pressure at which the control member is actuated, and wherein the apparatus further comprises electrical circuit means responsive to the actuation of the control member for comparing the pressure measured by the pressure measuring means with a preselected calibration pressure, and means responsive to said comparing means for adjusting the calibrating means until the pressure at which the control member is actuated matches said preselected calibration pressure.

7. An apparatus according to claim 1 further comprising timer means responsive to closure of the third controllable isolation device for producing first and second time signals at first and second predetermined times following said closure, electrical circuit means for comparing a first pressure measured by the pressure measuring means at said first time with a predetermined reference pressure and for comparing a second pressure measured by the pressure measuring means at said second time with the first pressure, first and second fault circuits responsive to the comparisons for respectively indicating a fault upon said first pressure being less than said reference pressure and for a discrepancy between the first and second pressures.

8. An apparatus according to claim 1 further comprising electrical means responsive to a predetermined value of flow measured by the flow measuring means for comparing the pressure measured by the pressure measuring means with a predetermined reference pressure, and a fault circuit responsive to the comparison for indicating a fault upon such measured pressure being greater than the reference pressure.

9. A method of checking the operation of a fluid control member using the apparatus of claim 1, the method comprising the steps of operating the apparatus during a first phase to verify actuation of the control member at a desired calibrated pressure, thereafter operating the apparatus during a second phase to check the fluid tightness of the control member at a pressure less than the calibrated pressure, and subsequently operating the apparatus during a third phase to check flow from the control member at a pressure higher than the calibrated pressure.

10. A method of checking the operation of a fluid control member using the apparatus of claim 1, the method comprising opening the first, second and third isolation devices so as to enable the main circuit to be filled with fluid; closing, in sequence, the second and the first isolation devices to isolate the inlet of the main circuit and the bleed circuit; controlling the volume variation means to increase progressively and without pulsation the pressure in the main circuit until actuation of the control member; measuring the pressure in the main circuit upon said actuation; and comparing said measured pressure with a predetermined calibrated pressure at which actuation is desired.

11. A method according to claim 10, wherein said control member includes a calibrating device for varying the pressure at which it is actuated, and said method further comprises automatically adjusting the calibrating device in response to said comparing until the actuation pressure of the control member matches the predetermined calibration pressure.

12. A method according to claim 11, wherein said comparing comprises comparing in an electrical comparator a signal representative of the measured pressure and a signal representative of the calibration pressure to produce an output signal representative of said comparison, and employing said output signal to control a motor connected to the calibrating device so as to vary the actuation pressure of the control member to match the calibration pressure.

13. A method of checking the operation of a fluid control member using the apparatus of claim 1, the method comprising adjusting the fluid pressure in the main circuit to a predetermined calibration pressure at which the control member is actuated to provide a fluid flow from the outlet of the main circuit; closing the third isolation device; measuring a first pressure in the main circuit at a first predetermined time following closing of the third isolation device sufficient to enable the pressure in the main circuit to drop below said calibration pressure; comparing the first pressure with a reference pressure less than the calibration pressure; indicating a fault if the first pressure is less than the reference pressure; measuring a second pressure in the main circuit at a second predetermined time following said first predetermined time; comparing said first and second pressure; and indicating a fault upon the first and second pressures being different.

14. A method according to claim 13 further comprising producing first and second time signals at said first and second predetermined times, and producing signals representative of said first and second measured pressures and said reference pressure, and wherein said comparing steps comprise comparing in an electrical comparator upon the occurrence of the first time signal the signals representative of the first pressure and the reference pressure and comparing in a second electrical comparator upon the occurrence of the second time signal the signals representative of the first and second pressures.

15. A method of checking the operation of a fluid control member using the apparatus of claim 1, the fluid control member being actuated at a predetermined calibration pressure to provide a flow from the output of the main circuit, the method comprising closing the second insulation device to isolate the bleed circuit from the main circuit and opening the first and third isolation devices; adjusting the flow regulating means of the bypass circuit to gradually increase the flow in the main circuit; measuring the flow in the main circuit; measuring the pressure in the main circuit upon the flow reaching a predetermined value; comparing the measured pressure with a reference pressure that is greater than the calibration pressure; and indicating a fault upon the measured pressure being greater than the reference pressure.

16. A method according to claim 15 further comprising producing a first signal representative of the measured flow, producing a second signal representative of the measured pressure, producing a third signal representative of the reference pressure, and wherein said comparing comprises comparing the second and third signals in an electrical comparator upon the first signal attaining a value corresponding to the predetermined flow.

* * * * *